United States Patent
Reineke et al.

(10) Patent No.: US 12,468,836 B2
(45) Date of Patent: Nov. 11, 2025

(54) METHOD OF DETERMINING DATA SET MEMBERSHIP AND DELIVERY

(71) Applicant: EMC IP Holding Company LLC, Hopkinton, MA (US)

(72) Inventors: Nicole Reineke, Northborough, MA (US); Stephen J. Todd, North Andover, MA (US); Donagh A. Buckley, Cork (IE); Aurelian Dumitru, Round Rock, TX (US); Robert A. Lincourt, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 631 days.

(21) Appl. No.: 17/085,374

(22) Filed: Oct. 30, 2020

(65) Prior Publication Data

US 2022/0138343 A1    May 5, 2022

(51) Int. Cl.
*G06F 21/62* (2013.01)
*G06F 16/332* (2019.01)
*G06F 16/338* (2019.01)
*G06F 21/31* (2013.01)

(52) U.S. Cl.
CPC ...... *G06F 21/6227* (2013.01); *G06F 16/3323* (2019.01); *G06F 16/3326* (2019.01); *G06F 16/338* (2019.01); *G06F 21/31* (2013.01); *G06F 2221/2141* (2013.01)

(58) Field of Classification Search
CPC ............. G06F 21/6227; G06F 16/3323; G06F 16/3326; G06F 16/338; G06F 21/31; G06F 2221/2141
See application file for complete search history.

(56) References Cited

U.S. PATENT DOCUMENTS

| | | | | |
|---|---|---|---|---|
| 9,195,744 | B2* | 11/2015 | Adachi | G06F 16/24535 |
| 10,503,923 | B1* | 12/2019 | Gupta | G06F 21/6218 |
| 11,327,992 | B1* | 5/2022 | Batsakis | H04L 63/083 |
| 11,803,556 | B1* | 10/2023 | Samdani | G06N 20/00 |
| 2004/0267551 | A1* | 12/2004 | Yadav | H04W 48/04 455/456.1 |
| 2008/0071742 | A1* | 3/2008 | Yang | G06F 16/951 |
| 2008/0147635 | A1* | 6/2008 | Im | G06F 16/951 707/999.005 |
| 2009/0083336 | A1* | 3/2009 | Srinivasan | G06F 11/1448 |
| 2010/0281012 | A1* | 11/2010 | Imig | G06F 16/9535 707/708 |
| 2010/0332583 | A1* | 12/2010 | Szabo | G06F 16/24578 709/217 |
| 2022/0129492 | A1* | 4/2022 | Zouhri | G06F 16/382 |

OTHER PUBLICATIONS

Roh, Yuji et al."A Survey on Data Collection for Machine Learning; A Big Data—AI Integration Perspective", IEEE, Aug. 2019.

* cited by examiner

*Primary Examiner* — Bassam A Noaman
(74) *Attorney, Agent, or Firm* — Workman Nydegger

(57) ABSTRACT

One example method includes receiving a user request for a data set, and the user request includes information concerning user requirements for the data set, identifying data records that satisfy one or more of the user requirements, calculating a respective relative value for each of the data records, and the relative values are based in part on the user requirements, and providing access controls for each data record that enable tracing of accesses of the data record.

16 Claims, 4 Drawing Sheets

METHOD OF DETERMINING DATA SET MEMBERSHIP AND DELIVERY

FIELD OF THE INVENTION

Embodiments of the present invention generally relate data management. More particularly, at least some embodiments of the invention relate to systems, hardware, software, computer-readable media, and methods for identifying, generating, and delivering, data sets.

BACKGROUND

Businesses and other customers often have a need for data sets that can be used for analytical and other purposes. However, current approaches to data set generation and delivery are highly manual, costly, and sub-optimal.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
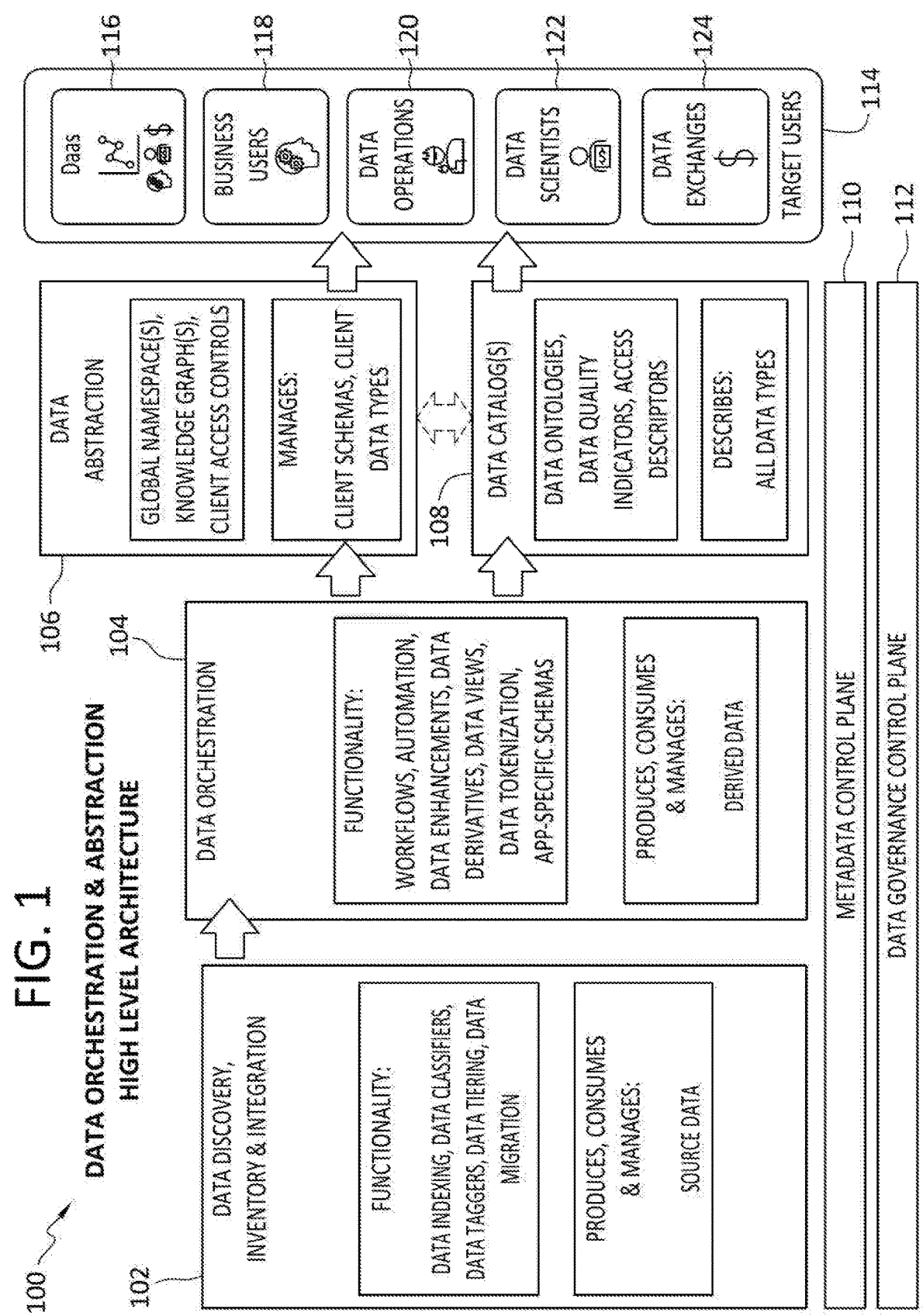
FIG. 1 discloses aspects of an example high-level Intelligent Data Management (IDM) architecture.

Embodiments of the present invention generally relate to data management. More particularly, at least some embodiments of the invention relate to systems, hardware, software, computer-readable media, and methods for identifying, generating, and delivering, data sets.

As contemplated by this disclosure, a 'data set' is a set of data records sufficiently large and/or complex as to render impossible the practical performance of any of the disclosed data set and data record processes by a human, whether as a mental process or otherwise. It is inherent in the nature of such processes, and the associated data sets and data records, that such processes are performable only by a computing entity such as a computer or computing system. To illustrate, one example data set may comprise 1 million data records.

In general, some example embodiments of the invention may involve the implementation and use of a Relative Value System (RVS) in conjunction with a metadata control (MC) plane and a data governance control (DGC) plane. The MC plane may send instructions to an orchestrator for collation of content to be included in a dataset, and the RVS, whose operation may be triggered by the MC plane, may provide input to the MC plane as to the content and generation of the data set. The DGC plane may implement various functions relating to access control for the dataset.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that some embodiments may provide fast generation of multiple data sets based on a single inquiry, even where the entity requesting the data may be unclear as to what data is needed. In an embodiment, data sets may be generated that include records that are ranked according to various criteria. In an embodiment, a feedback mechanism may be employed that may enable modifications to record rankings so that, for example, more relevant content may be captured in response to a data set generation request. In an embodiment, data set creation may improve over time through learning that may be based on user feedback. In an embodiment, provision may be made for data set record access and tracing.

B. Overview

As noted herein, embodiments of the invention may implement various useful functionalities, thereby overcoming and/or avoiding possible problems in the generation and provision of data sets to customers. Some examples of such problems are addressed below. This discussion is not intended to limit the scope of the invention in any way.

One of the largest problems that customers report with data science is the gathering and generation of meaningful data sets for use in analysis. For example, one source has noted that Data collection is a major bottleneck in machine learning and an active research topic in multiple communities. There are largely two reasons data collection has recently become a critical issue. First, as machine learning is becoming more widely-used, we are seeing new applications that do not necessarily have enough labeled data. Second, unlike traditional machine learning, deep learning techniques automatically generate features, which saves feature engineering costs, but in return may require larger amounts of labeled data.

In more detail, data set generation and management is difficult, time-consuming, and costly. As well, some customers may require massive data sets. Such customers may generate data sets from existing, and future, data within their organization, as well as external data, to ensure both volume and training capabilities. The creation of data sets may largely depend on the manual or automated generation of labels that may be applied to data that is believed to be responsive to a user data request. The generation and application of labels requires the human ability, and focus, to properly tag and represent data with the appropriate labels. At the same time, it may be the case that new content is also being generated. Tags or labels may be applied to both original and new content. However, it is important to note that the results set required may have different schemas.

Typically, the customer is unable to pre-define and assign labels to create insight into the data prior to the time that the data itself is requested. Further, the customer is frequently unaware of new categories or applications of data to a problem until the need arises. When using data set generation mechanisms, it is often unclear which form of discovery or correlation will net the optimal results for the type of job the scientist is performing. These circumstances may lead to a massive post-need discovery which may require manual aggregation and post-labeling of data to identify the data that is needed to meet the needs of an analysis. Some attempts have been made to automatically label data sets, but that approach has proved unsatisfactory, at least because such attempts fail to consider the difficulty of creating context from massive disparate data, including the context of collection and orchestration of the data.

Yet another problem facing data scientists and other is that they do not always know the exact location or content of the data needed, notwithstanding that data set generation is often prescriptive, that is, input must be provided by the user in order that a corresponding data set can be generated. Thus, the data scientist may not have enough information to request the data that is needed.

Current approaches to data set generation typically require exact, or nearly so, matching of keywords on a known data location, and the use of standard filter/sort criteria, such as these examples: trigger-based or threshold-based queries such as, for example, 'return patient data for patients who exhibited fevers above 99 degrees'; behavior-based, for example, 'return consumer data for consumers who are at least 25 years old and eat a vegetarian diet'; or, condition-based, for example, 'return car repair estimates by body shop based on similar types of car accidents for a similar model of car handled by the respective body shops.' However, such an approach to data set generation fails to take into consideration, for example: how the data is intended to be used; how the inquiry relates to other/adjacent/collateral sources of information; and, how relevant the newly generated data labels are for the target use case and/or situation that the customer is interested in.

Still another concern that that data sets generated by conventional techniques do not record or, communicate, that records within the generated data set may have a different respective value and cost of delivery to each user. In particular, data quality, uniqueness within a data set, that is, whether a record appears repeatedly or is an outlier, relevance, and accessibility, are some examples of qualities not considered by convention approaches but which may contribute to the relevance of a record as part of a data set. At present, no standardized way exists to quantify and convey the value of an individual piece of data, such as a record, within a data set. This shortcoming impacts the ability of the data set generator to make automated, informed acquisition decisions and prioritize inclusion of a record. Moreover, as typical data sets do not supply a method of understanding record value within the data set, data set delivery mechanisms treat data sets as a whole. This may result in generation of a data set that provides little or no insight into the significance of individual records or sub-groups of records. Instead, only broad generalities may be drawn from the data set. This approach is problematic as well insofar as it may result in longer processing wait-times, and higher storage and memory utilization while loading the full data set, rather than loading only the most relevant records. Some end users work around this by creating fetching algorithms, but this is an inefficient and one-off practice not well suited to repeated usage.

Another problem that may be addressed by embodiments of the invention is that current techniques for data set generation lack the ability and configuration to learn from past utilization. In particular, current data set generation solutions do not record and use the past value rating of data sets as a whole, as well as per record within a data set, when making recommendations as to records that should be included in a data set. This lack of learning results in a failure to optimize data set generation.

In contrast, example embodiments may employ a learning paradigm that may take into consideration, for example, parameters such as, but not limited to: data accessibility; inquiry types; inquiry persona, that is, nature and/or identity of the entity requesting the data set (such as, for example, groups or departments like marketing, sales, engineering/technical, scientific); inquiry vertical; individual data performance within past inquiries; data record relevance within a data set; and, previous ROI (Return On Investment) achieved from similar data.

Insofar as conventional approaches fail to employ a learning process, including considerations such as those just noted, problems may arise when a user is acquiring data sets from external sources. In typical approaches, a data set purchaser, such as a sales organization for example, may see a sample of the data in the data set prior to buying that data set, but there is no way for that buyer to understand the relative value of the content itself. As well, it is typically the case that the purchaser is unable to see the actual content of the data prior to purchase.

In contrast, example embodiments may enable an ability to make high-value data sets and informed decisions prior to purchase, by implementing a quantitative measurement against data sets and records within a data set. Such embodiments may also enable learning based on user inquiries and user paradigms.

Another concern with conventional approaches is that while there may be various ways to create correlation inferences, conventional data set generation processes typically only consider one of those ways at a time. For example, typical approaches may gather and supply data sets based on processing techniques which are specified by the data scientist or a DataOps engineer. However, and in contrast with example embodiments of the invention, such approaches do not automatically identify, and weight, multiple data set recommendations using differing processing techniques based on similar inquiry, past utilization value, and success.

Conventional approaches to data set generation are also lacking in terms of record ownership and security considerations. For example, conventionally generated data sets do not maintain individual record ownership or security details, that is, the information concerning ownership is transient only. Thus, conventional data sets fail to identify the permissions or other constraints or parameters, if any, associated with individual records that may be independent of each other. This failure of conventional data sets and data set generation processes presents a significant security risk in the production of data sets for rental by other parties, or for use by other departments within the enterprise, since while an original record may have been associated with security measures when it was created or modified, the inclusion of that record in an ad hoc data set requested by a customer may not carry forward those security measures with that record in the data set. In a related vein, and in contrast with embodiments of the invention, conventional approaches fail to set limitations on data set, and individual record, usage, such as boundaries on the timeframe for use of the record, prevention of data copying, and requirements to clean up of data traces, including the removal of interpreted results of a data set request.

Finally, and in contrast with some embodiments, conventional data sets and data set generation processes do not provide mechanisms for automatically tracing all locations where a data record has been. This approach may introduce compliance risk since the enterprise is unable to determine, or demonstrate, a trusted chain of custody for a record. The example of the General Data Protection Regulation (GDPR) is illustrative, as that regulation requires the ability to demonstrate tracing of all locations where client data has ever been stored. Conventional data sets and data set generation processes do not enable the ability to trace every data set that a record has been a part of so that the record can be removed from all of those data sets to ensure the removal of the record. Moreover, when new laws are passed, it is necessary to have the ability to understand and trace the location of all information, functionality that is provided by example embodiments by not by conventional processes.

C. Aspects of an Example Architecture and Environment

The following is a discussion of aspects of example operating environments for various embodiments of the invention. This discussion is not intended to limit the scope of the invention, or the applicability of the embodiments, in any way.

Note that for the purpose of this disclosure, a 'data set' embraces, but is not necessarily limited to, a collection of information that may correspond to a specific need identified by a consumer, such as a human and/or machine. The data set may be generated in response to, and based upon, a request by a user, but that is not necessarily required. For example, in some instances, a data set may be generated on the initiative of an entity other than a consumer, such as a data storage and protection entity for example. A data set generated for a consumer may be a subset of the data associated with that consumer. In connection with these points, a 'record' embraces, but is not necessarily limited to, an individual component of the data set, but does not necessarily imply any particular type of content. A data set may have any number of records, and the records in any data set may or may not all be of the same type. A record in a data set, and/or a record not included in a data set, may correlate to a data set request generated by a consumer. As used herein, 'correlation' and its forms embrace, but are not necessarily limited to, a measure of how strongly one variable depends on another. Consider a hypothetical dataset containing information about professionals in the software industry. We might expect a strong relationship between age and salary, since senior project managers will tend to be paid better than engineers. On the other hand, there is probably a very weak, if any, relationship between shoe size and salary. Correlations can be positive or negative. Our age and salary example is a case of positive correlation. Individuals with a higher age would also tend to have a higher salary. An example of negative correlation might be age compared to outstanding student loan debt: typically older people will have more of their student loans paid off. Finally, 'semantic correlation' embraces, but is not necessarily limited to, text analyses that identify relatedness between units of language, such as words, clauses, or sentences for example, and therefore records. Identification of relatedness may be achieved using statistical approaches such as a vector space model to correlate contexts from a suitable text corpus.

It is noted further that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With reference now to FIG. 1, an example architecture 100 according to some example embodiments is disclosed. Such an example architecture 100 may be referred to herein as comprising an Intelligent Data Management (IDM) architecture. The example architecture 100 may be employed in the creation and deployment of products and services that may improve the ability to consume data. Thus, example embodiments may operate to implement processes including, for example, discovering and preparing data sets and delivering data sets for use by analytic algorithms and business users. Such data sets may comprise, for example, collections of data records, content, metadata, or other for consumption by an end user or application. Data records may also be referred to herein simply as 'records.'

In general, the architecture 100 may comprise various functional modules including, for example, Data Discovery, Inventory, & Integration 102, Data Orchestration 104, Data Abstraction 106, a Data Catalog 108, a MC Plane 110, and DGC Plane 112. Outputs of the example architecture 100 may be provided to various target consumers 114, such as, but not limited to, Data As A Service (DaaS) platforms 116, business users 118, data operations 120, data scientists 122, and/or, data exchanges 124, for example.

As indicated in FIG. 1, the Data Discovery, Inventory, & Integration 102 module may produce, consume, and/or, manage data. Example functionalities that may be implemented by the Data Discovery, Inventory, & Integration module 102 with respect to the data include, but are not limited to, data indexing, data classification, data tagging and labeling, data tiering, and data migration. Processed, and/or unprocessed, data may be passed by the Data Discovery, Inventory, & Integration module 102 to the Data Orchestration module 104, which may also be referred to as a data orchestrator.

The Data Orchestration module 104 may produce, consume, and/or manage, derived data. Derived data may be generated, for example, based on data received from the Data Discovery, Inventory, & Integration module 102, and the derived data may be created, for example, as a result of the application of one or more of the functionalities of the Data Orchestration module 104. As indicated in FIG. 1, such functionalities may include, for example, generating and implementing workflows, performing automation, generating and implementing data enhancements, creating data derivatives and data views, performing data tokenization, and creating and implementing app-specific schemas.

As further indicated in FIG. 1, outputs of the Data Orchestration module 104 may be provided to the Data Abstraction module 106 and/or to the Data Catalog 108. The Data Abstraction module 106 may, for example, manage client schemas and client data types, and the Data Abstraction module 106 may implement such functions as creating global namespaces, creating knowledge graphs, and defining and implementing client access controls. The Data Catalog 108, which may communicate with the Data Abstraction module 106, may include information and metadata for various data types. Such information and metadata may include, for example, data ontologies, data quality indicators, and data access descriptors.

D. Aspects of an Example Functional Stack and Architecture

Figure 2:
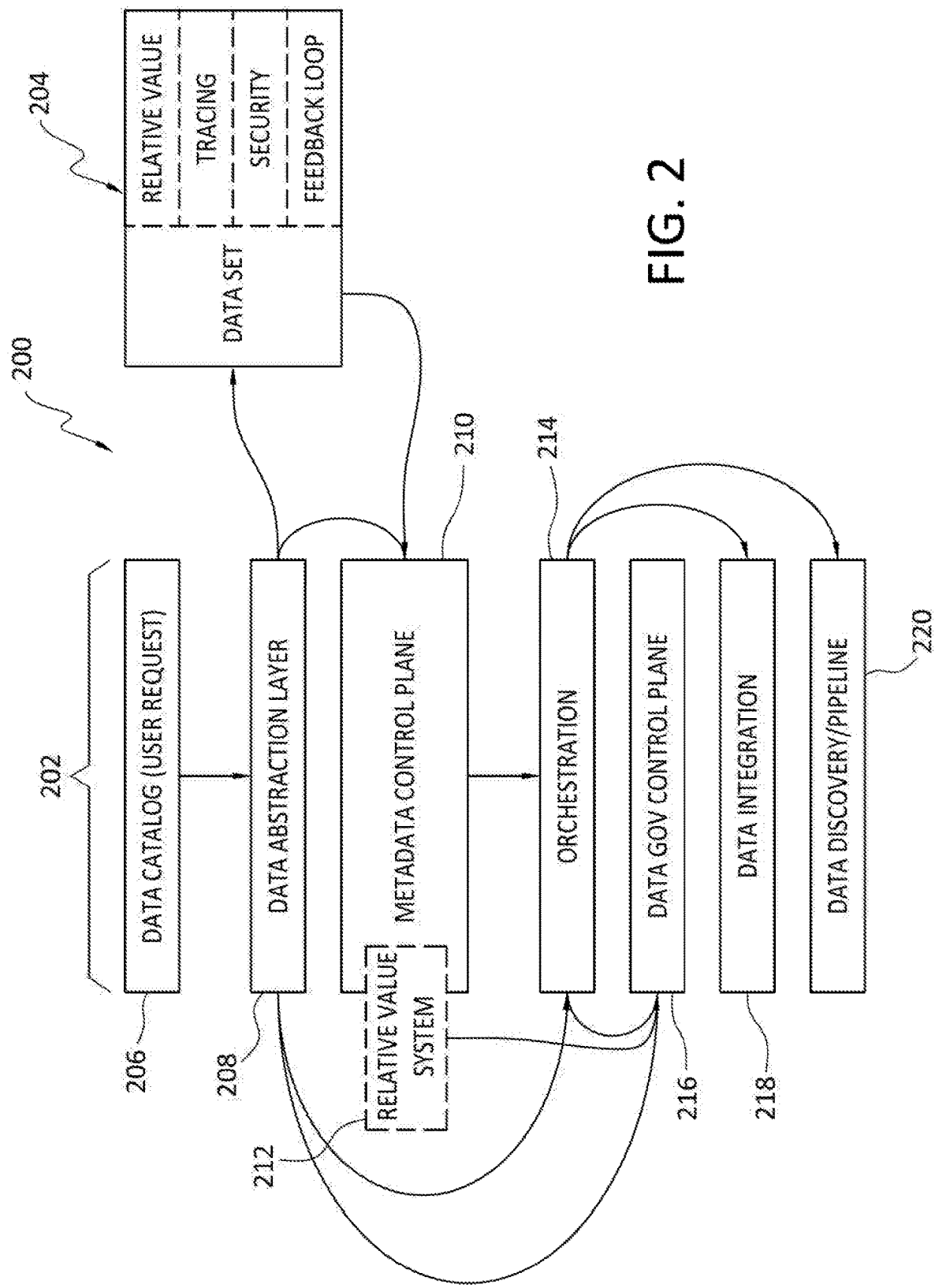
FIG. 2 discloses aspects of an example architecture that includes a metadata control plane, relative value system, and data governance control plane.

With reference now to FIG. 2, details are provided concerning an example architecture 200 for determining data set membership and performing data set delivery. In general, the architecture 200 may include a stack 202 that may operate to generate a data set 204. The stack 202 may include, for example, a data catalog layer 206, data abstraction layer 208, an MC plane 210 that may operate in connection with an RVS 212, an orchestration module 214, a DGC plane 216, data integration layer 218, and a data discovery pipeline layer 220. As shown by the connecting lines, various modules of the stack 202 may communicate with each other and/or may perform various processes with respect to the data set 204, such as receive, generate, modify, and/or transmit, the data set 204. In general, the elements 'Relative Value,' 'Tracing,' 'Security,' and 'Feedback Loop' may constitute a manifest that applies to the data set 204.

In general, the RVS 212 may leverage, for example, the respective functionalities implemented by the Data Discovery, Inventory, & Integration module 102, Data Abstraction module 106, DGC plane 112, and MC plane 110 of FIG. 1. As well, the example architecture 200 may employ a definition of a data set that may enable various functionalities as part of a comprehensive intelligent data management strategy. Such functionalities may include, for example, relative data record ranking, data set ranking, multiple data set recommendations, weighted recommendations, comprehensive record keeping, security enablement, non-prescriptive data set generation, and communication.

With specific reference to the MC plane 210, that component may, for example, capture labels, tags, and discoverable information about known data. This data may be discovered, by the MC plane 210, by way of, and/or fed in through, mechanisms such as the Data Discovery/Pipeline module 220. Additionally, the MC plane 210 may be configured, and operate, to store, for example: information regarding the queries that request data sets; the source and timing of data set requests; methods of data set generation available to the end user for the type of request/org/permissions; methods of data set generation for the data set that was selected by the end consumer, including rules/permissions pertaining to the data set; the type of process that the data in the data set was used by the consumer for; success of the data set in meeting the consumer needs, where the data set may have been generated in response to a manual, or triggered, data set request; success in the individual record as part of a data set, that is, the extent to which the individual record was responsive to the query and/or satisfied the need of the consumer; and, the calculated, quantitative value of a record as part of a request type, user, organization, and within a data set, for use in future data set generation. The MC plane 210 may send instructions to the Orchestration module 214 for collation of the content, such as one or more records, which will be included in a requested data set.

With continued reference to FIG. 2, the RVS 212 may comprise a group of services whose operation may be triggered by the MC plane 210 in response to events received by, and/or that implicate, operation of the MC plane 210, such as, for example, data access queries, data utilization triggers, data discovery triggers, feedback loops from data sets, or other automated services. Thus, the RVS 212 may implement various functionalities. For example, the RVS 212 may prioritize the method by which a data set is generated in response to a request. That is, the RVS 212 may identify, and select, a particular method that will be used to generate a data set, and the priority of use of the selected method relative to another method may be specified by the RVS 212, and may be considered by the RVS 212 when a request to generate a data set is received from a consumer. As another example of RVS 212 functionality, the RVS 212 may supply secondary recommendations as to other methods of data set generation, and variations to the content to be included in the data set. Such recommendations may be based on a request and its properties and how those map to the value reported against other data set inquiries. Embodiments of the RVS 212 may calculate the relative value of one or more records within a data set. This relative value may be calculated, for example, based on the reason(s) that the record was requested. For example, data requested for use in testing a new algorithm may have a relatively higher, or lower, value than data that was requested to determine compliance with privacy regulations.

The relative value of a record may be calculated or determined based on its relevance to one or more prior data set requests. For example, a record may have a relatively high value if it is highly relevant to a prior data set request, or the record may have a relatively low value if it is of little, or at least relatively less, relevance to a prior data set request.

Additionally, or alternatively, the relative value of one or more records may be calculated based on the awareness of the RVS 212 prior data set requests and the utilization that was made of the data returned in response to those requests, and may additionally or alternatively be calculated based on the overall value of the data set to which the records belong as compared with the values of prior data sets, and/or user feedback concerning data in the prior data sets.

To illustrate, a user might request crime statistics for Boston, MA. An embodiment of the invention may note that Worcester is relatively close to Boston, and based at least on the similar geographical locations of the two cities, may suggest to the user that crime statistics for Worcester also be included in the data set that will be generated for the user.

Thus, the RVS 212 may inform the MC plane 210 and then make inferences, such as concerning the quality or relevance of data included in a requested data set, or concerning how the data set may be modified to better fit the needs of the consumer, for example. The inferences may be based on various data and inputs including, but not limited to, feedback received from a user concerning the results of the use of the data set by the user.

The MC plane 210 may communicate, and operate in connection with, the DGC plane 216. Among other things, the DGC plane may supply the Data Abstraction layer 106 and Orchestration layer 214 with "right to access" verification capabilities, that is, access rights with respect to records of the data set, or selected portions of each record. For example, a record may comprise both confidential and non-confidential information and unless a requesting user has been granted access to the confidential information, access for that user may be limited to the non-confidential information. In some cases, an entire record may be confidential, or non-confidential.

The DGC plane 216 may also comprise the capability to maintain a record of individual record access control rights, as well as historical placement of one or more records in other data sets, and the DGC plane 216 may be able to track, across multiple data sets and over a period of time, access to a record included in those data sets. That is, the DGC plane 216 may be able to track which entity, or entities, accessed a record, as well as when and where the access took place, even if that record is, or was, a part of multiple different data sets. As well, the DGC plane 216 may show, such as to a user, data that may possibly be related to data requested by and/or delivered to the user.

Thus, example embodiments may enable the data rights permissions to be associated with, and follow, individual records of one or more data sets from the time the record is created until the time the record is deleted. Such tracking may, in fact, enable deletion of records that are not permitted to be retained for some reason, such as retention is forbidden by a data retention regulation. Thus, the ability to associate data rights permissions at the record level in a data set may be useful in secure environments where access control is implemented. Data rights permissions may also be associated with a grouping of records, such as if the records in the group share one or more common attributes. For example, all records created by a particular entity within a particular timeframe may be assigned the same data rights permissions.

Other useful aspects concerning the use of data rights permissions relate to denial of service attacks, and access denials. In general, such attacks and denials may permit an inference to be drawn that that the data under attack has some amount of value, whereas hackers and others may be unlikely, or less likely, to attempt to access data of little or no value. Further, data of relatively high value to an unscrupulous actor may also be of relatively high value to a customer, and the price charged for generation of a data set that includes such data may be set to reflect such value.

With regard to data sets such as may be defined, requested, generated, modified, deleted, and/or otherwise processed or managed, in connection with embodiments of the invention, such data sets may comprise, for example, a collection of records assembled based on one or more user-defined labels or tags. Such data sets may additionally, or alternatively, comprise relative value ranking information and metadata that identifies the value of a record, or group of records, in a data set, relative to the value of another record, or group of records, in that data set. Such relative value ranking may enable, for example, prioritized access to data records of a data set, and prioritized movement of data records of the data set. With regard to prioritized access for example, a relatively higher value record may be more likely to be included in some data sets and/or may be made available for access, by particular users, ahead of other records made available to that user. Disclosed data sets may also enable record tracing, which may comprise creation, in response to a trigger for example, of a record of all access to data records within a data set, or access to a particular subset of records in the data set. As noted earlier, embodiments of the invention may provide for data sets that implement record-level security measures. For example, a user interface to a data set may be provided that enables, on a record basis for example, access right verification, access rights, and time bound features. Such a time bound feature may specify, for example, that a particular user has access to a particular record for a specified time and/or until a particular time. As a final example, example data sets and mechanisms for their generation may provide for, or at least enable the use of, feedback loops. Example feedback loops may comprise a rating system to generate feedback, from a consumer and/or other entity, with respect to record attributes such as, for example, the relative value of a record included in a data set.

E. Aspects of an Example Workflow

Figure 3:
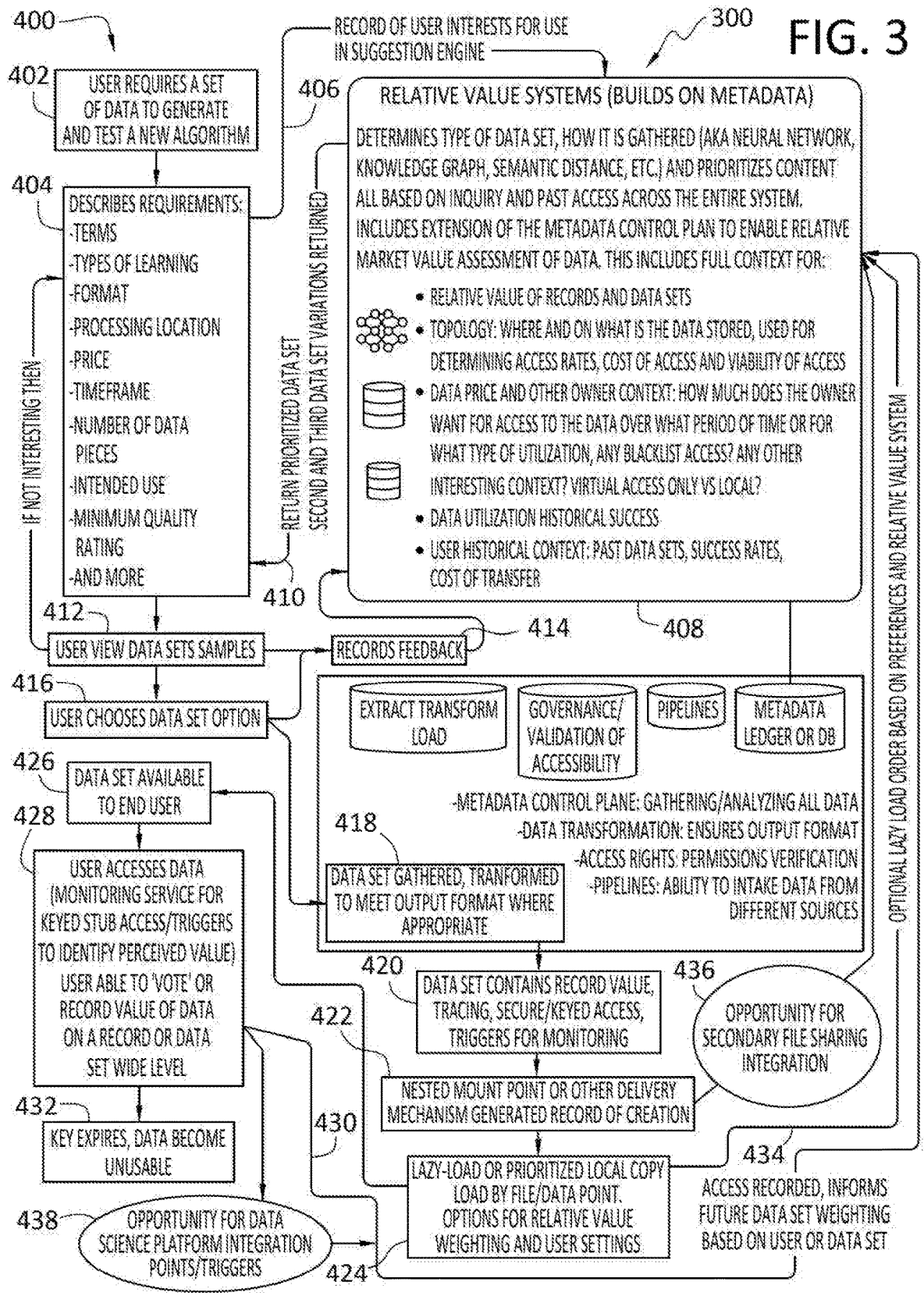
FIG. 3 discloses an example workflow and methods according to some embodiments of the invention.

Turning now to FIG. 3, respective features of an MC plane, RVS, and or DGC plane, may enable a streamlined data set generation workflow with a high probability of end user success, that is, a high probability that the generated data set will satisfactorily fulfill the needs of a consumer who requested the data set. One example of such a workflow is disclosed in FIG. 3 and denoted at 300. Following is a discussion of some aspects concerning the example workflow 300.

On aspect of the example workflow 300 is that multiple high-value data sets may be generated based on a single user inquiry or data set request, even if the consumer requesting the data set does not know exactly what records may be needed to adequately fulfill the request. Moreover, embodiments of the RVS, and disclosed data set attributes may enable users to create prioritized, multiple variants of data sets that contain records of high relevance.

As well, by storing past inquiries, that is, dataset requests, and the value of the records and data sets mapped to past inquiries, it may be quickly ascertained which data set creation method and record content may be most relevant to a particular inquiry and, thus, most valuable. For example, data may be included in a data set based upon the similarity, or lack of similarity, of that data to other data that the same user has requested. Prioritizing the method of data set correlation based on past data sets may offer a dramatic improvement in performance over manual generation of data sets one by one, or running all known methods of correlation against a data set.

To illustrate, suppose that a data set is requested that has a 'Trigger for Threshold,' that is, a record will be included in the data set if the record meets some type of threshold defined by the user who requested the data set. Records not meeting the threshold will not be included in the data set returned to the user. Alternatively, a record may be excluded from the data set if the threshold is met, or included in the data set if the threshold is not met. Next, a comparison may be performed of how 'Trigger for Threshold' inquiries ranked their respective data sets. As a result of the comparison, it may be determined that this type of inquiry, that is, a 'Trigger for Threshold' inquiry, may be best met with a data set that is generated using a direct correlation method instead of, for example, a semantic correlation of record discovery.

In some instances at least, the direct correlation method may produce a higher relative value data set. To continue with this example, it may also be determined that the second-highest ranking data set for this inquiry type was created using a knowledge graph (KG). Next, various data sets may be suggested to the user. For example, a primary data set, that is, a data set that used the direct correlation method, may be generated and its predicted relative value determined. Similarly, a secondary data set, that is a data set that used the KG method, may be generated and its predicted relative value determined. Both the data sets and their respective relative values may be provided to the user. The user may then choose from among the data sets presented. Additionally, or alternatively, the user may run an algorithm or other routine against one or more of the data sets to evaluate the performance of the algorithm, or to evaluate the data included in the data set. In at least some embodiments, data sets such as those referred to in the foregoing illustrative example may be generated, and presented to a user, automatically. Such processes may be performed automatically in response to, for example, user input concerning a prior data set that was generated. Such automated data set generation may result in a measurable reduction in cost of data set creation for the consumer, and a relative reduction in the time needed to achieve the consumer goal to which the data set(s) pertain.

Still other functionalities of example embodiments may be brought to bear in various circumstances, including those of the illustrative example discussed above. For example, because user access requests for records may be traced across multiple data sets, second and subsequent data set inquiries for records, and/or data sets, with similar content may be traced. That is, such tracing may identify, on a record-level basis for example, when and how one or more records are accessed and used. Tracing may be performed both with respect to legitimate access requests, and with respect to access requests from hackers or other bad actors.

The system may proactively note that when a user or consumer is seen to request a data set with a trigger threshold, that user frequently returns for a data set based on 'Behavioral Properties' for example. In this way, consumer access may be enabled to data even when that data has not been prescriptively labelled to match the trigger-based request of the user. One or more additional data sets may then be generated, and made available to the user or consumer, that overlap with some of the records of 'triggering event' that also include 'behavioral data.' That is, the overlapping records may comprise behavioral data, while also satisfying the trigger event criteria.

Thus, such overlap may comprise one or more records that are common to two or more of the data sets made available to the consumer, even if the reasons for inclusion of those records in the respective data sets may vary from one data set to another. As well, data sets may be provided using the triggering event as a filtering mechanism, and such data sets may be created using the second or third most popular method of labelling or discovery and offered as comparative data sets for the consumer to choose from. Each of these data sets may be provided with a respective relative value ranking. The user may then choose to rank the relevance, providing for better learned data set suggestions in the future. Thus, for example, a relatively higher ranked data set may include records that are relatively more relevant to requirements specified by a consumer than are the records of a data set with a relatively lower rank.

Thus, embodiments of the invention may consider prioritization of records in a data set, as well as the parameters of data set inquiries, to infer the type and content of a subsequent data set, even if the user has not specified such type or content. Thus, embodiments of the invention may use historical data to learn from prior processes to anticipate the type and content of a further data set that may meet the user needs better than prior data sets. Accordingly, the user may be relieved of the burden to continually tune its data set requests, and such tuning may instead be performed by some embodiments of the invention.

Another useful aspect of some embodiments concerns the generation of higher-value data sets with cost awareness and prioritized access based on value:cost ratio within a data set. The use of record ranking in relation to a data set, data inquiry, and data type can reduce the number of records needed, create higher value record sets, as well as enable prioritization for pre-fetching of high value data.

Particularly, by having a value rank on records, as those records relate to particular data sets and inquiry types, each record may be prioritized within a data set for each variant of intended utilization. Moreover, by including telemetry and topography data, as well as enabling 'cost of sale/rental' in instances of paid third party access to the data, a relative cost by data record may be ascertained. The value and the cost may then be used to create cost-based data sets. Costs may additionally or alternatively comprise rental/acquisition cost, and/or telemetry/topographical cost like location and storage.

A further example of results that may be enabled, either in whole or in part, by a workflow such as the example workflow 300 of FIG. 3 is generation of a relatively granular understanding of record values to data sets over time. That is, any given data set may be evaluated on a per-record basis, including assignment of a relative value ranking to one, some, or all individual records in a data set, should there be a need to do so. By employment of a feedback mechanism, that may comprise user feedback actively provided by a user and/or passive feedback such as information concerning user access and use of data records, may enable relative value rankings of records to change and be refined over time. Collecting and using information such as detailed inquiry, access, user, and type, information for data set records may provide detailed learning insights for improving the data records included in data sets.

With continued reference to the granularity aspects of example embodiments, improved ranking of the individual records within a data set may increase the ability to generate highly relevant content, provide for better prioritization and matching of suggested data set collation mechanisms to the needs of a customer, and enable reduced manual overhead by generating multiple data sets based on a single customer request. As well, embodiments of the invention offer an opportunity for general improvement of data records, as well as exceptional personalization of data set preparation by utilizing the known approvals and recommendations of an individual requestor, or group or organizational requestor, as a basis for generation of follow on data sets.

Workflows, such as the example workflow 300 may also employ data set creation mechanism improvement over time, through learning from historical data and user input, for example. For example, and as noted above, example embodiments may automatically identify and weight multiple data set creation recommendations using differing processing techniques based on similar inquiry past utilization value and success. Success may be measured, for example, by the relative scores and rankings of data sets generated for a customer, and the relative scores and rankings of data records in those data sets. The ability to use ranking of the data sets with a record of how the data sets were generated, such as through the use of a KG, NLP, BERT, or semantic processing for example, may enable the system to prioritize the method of gathering and understanding information about data upon receipt of a new data set request from a user. This, in turn, may lead to improved data set generation speeds, better prioritization of data set creation mechanisms by inquiry type, and reduced manual overhead.

Finally, example workflows may employ access tracing and granular record access for improved security and privacy of data records and data sets. For example, record-level security access notation and enforcement within a data set, as disclosed herein, may enable long-term security and privacy of data sets and data records. Moreover, the implementation by example embodiments of record-level security notation within data sets, may enable various methods of data delivery and access to be implemented which may, among other things, enforce role-, user-, location- or other-based privacy and security access rights. Finally, implementing tracing functionality on accesses, and attempted accesses, of data records, and possibly all data records in a data set, may help to ensure that all locations of record access and storage are traceable and recorded. Such information may aid in identifying any privacy violations, ensuring and demonstrating compliance with any applicable data handling regulations, and aiding in governance and content-reporting requirements. Such access tracing may include, for example, tracing both successful and unsuccessful attempts to access data, the data that was accessed or attempted to be accessed, the owner of the data, as well as the number of attempts made, the identity of the party that made the attempt, and when and where the attempt was made.

E. Example Methods

It is noted with respect to the example method of FIG. 3 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

With continued attention to FIG. 3, the example workflow 300 may include various methods and processes. One example method is denoted at 400 and may begin when a consumer or other user requests a data set 402, such as may be used to test a new algorithm that the consumer has created. The request may be submitted by way of a user interface (UI) in the case of a human user, or may be generated and submitted by a computing entity. The request submitted by the user 402 may specify 404 various requirements pertaining to the requested data set.

In some instances, such as when the user has previously requested a data set, the system may access 406 previously recorded information concerning that user and may use that information to generate, and present to the user, suggestions as to a particular existing data set that may be responsive to the user needs and/or suggestions as to specific parameters that could be included in the user request to generate a responsive data set. In some embodiments, accessing the previously recorded information 406 may comprise generating one or more new prioritized data sets that may be presented to the user for selection. With particular reference to the example of FIG. 3, an RVS, for example, may generate 408 prioritized data sets and present those prioritized data sets 410 to the user that requested 402 the data set generation.

After the user has been presented with an existing data set, new data set, and/or, suggestions as to possible modifications to the data set request, the user may view 412, or otherwise access, samples of data sets. The samples may be of existing data sets and/or the samples may be samples of data sets that could be generated should the user so decide.

If the samples are not of interest to the user for some reason, the method may return to 404. Whether or not the samples are of interest to the user, the user may in any case provide feedback concerning the samples, such as whether or not the samples are relevant to the user circumstances and needs, and the feedback may be recorded 414 for future use, such as in the generation of new data sets 408, and/or presentation of data set parameters to the user for consideration in generation or modification of a data set request and/or a data set.

After having viewed one or more data set samples 412, the user may select a particular data set 416. The selection 416 may also be recorded as user feedback 414. In response to the selection 416, the data set may then be generated 418. As shown in FIG. 3, various processes may be involved in the generation of the data set 418 including, but not limited to, gathering of data consistent with the data request, and transforming the gathered data into an output format specified by the user. The data set may contain 420 record values, tracing information and metadata, secure access provisions, and triggers for monitoring. At 422, a delivery mechanism for delivery of the data set to the user may be implemented. The data set may then be loaded 424 for access by the user. Any suitable loading process, such as lazy loading for example, may be used. In one example lazy loading process, the data set may not be loaded all at once but instead may be loaded over a period of time and/or on an as-needed basis.

After the data set is loaded 424, it is then available 426 to the user, and the user may then access 428 the data set. In some instances, the data set may be configured for key-based, or other, permission-based access. Access, and attempted access, to the data may be monitored and recorded for tracing purposes. As well, the user may record a relative value of the data set and/or relative respective values of one or more records in the data set. These relative values may be captured, for example as feedback 430.

In some embodiments, the data set may be provided to the user without any restrictions on the amount of time that the data set will be accessible to authorized users. In other embodiments, the data set may be provided with a time-sensitive access key, upon the expiration of which, the data set may become unusable 432 since it can no longer be accessed.

With continued reference to the example of FIG. 3, various other functions and operations may be included as part of the workflow 300, or as adjuncts to the workflow 300. For example, because actual and attempted data access efforts may be recorded, information concerning those efforts may be used as feedback 430 to inform future data set weighting. That is, if data is repeatedly accessed for example, those data records may be weighted more heavily than relatively less actively accessed data.

Another example function that may be implemented in connection with the workflow 300 concerns loading of a data set for user access. For example, parameters of the loading process 424, such as a lazy load order of data set loading, may be provided 434 as inputs to the RVS and the functions performed by the RVS. The lazy load order may, in turn, be a function of user preferences and other parameters provided by the RVS.

As also indicated in the example of FIG. 3, embodiments of the invention may enable 436 the data set generation system to integrate with data hosting providers, examples of which include Box and Sharepoint, to enable a seamless, from the user perspective, data delivery experience. For example, data sets generated by the data set generation system may be hosted by a data hosting provider. Thus, a user may realize the benefit of data sets generated specifically for the user, and hosted on a hosting platform.

Finally, embodiments of the invention may enable 438 an ability to provide an SDK (Software Development Kit) or API (Application Program Interface) to data science platforms, one example of which is Jupyter Notebooks. In this way, user access information (see 428) may be provided to the data science platform for generation of future recommendations and modifications to data sets that may be generated for a user.

F. Further Example Embodiments

Following are some further example embodiments of the invention. These are presented only by way of example and are not intended to limit the scope of the invention in any way.

Embodiment 1. A method, comprising: receiving a user request for a data set, and the user request comprises information concerning user requirements for the data set; identifying data records that satisfy one or more of the user requirements; calculating a respective relative value for each of the data records, and the relative values are based in part on the user requirements; and providing access controls for each data record that enable tracing of accesses of the data record.

Embodiment 2. The method as recited in embodiment 1, wherein a relative value is based on relevance of the associated data record to the user requirements.

Embodiment 3. The method as recited in any of embodiments 1-2, wherein a relative value is based on user utilization of a data set which included the associated data record.

Embodiment 4. The method as recited in any of embodiments 1-3, further comprising generating a data set that includes the data records.

Embodiment 5. The method as recited in embodiment 4, wherein the data set is generated based on user feedback concerning a prior data set that included one or more of the data records.

Embodiment 6. The method as recited in embodiment 4, further comprising presenting the data set to a user and receiving user feedback concerning the data set.

Embodiment 7. The method as recited in embodiment 4, further comprising generating one or more additional data sets, such that a plurality of data sets are generated, and each of the data sets is generated by a different respective method.

Embodiment 8. The method as recited in embodiment 7, wherein the data sets in the plurality of data sets are ranked relative to each other and presented to the user for selection.

Embodiment 9. The method as recited any of embodiments 1-8, further comprising tracing and recording, on a data record basis, an access history of each data record.

Embodiment 10. The method as recited in any of embodiments 1-9, further comprising providing a suggestion to the user concerning the requested data set, and the suggestion is based on one or more of user feedback concerning another data set, and usage information concerning the another data set.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
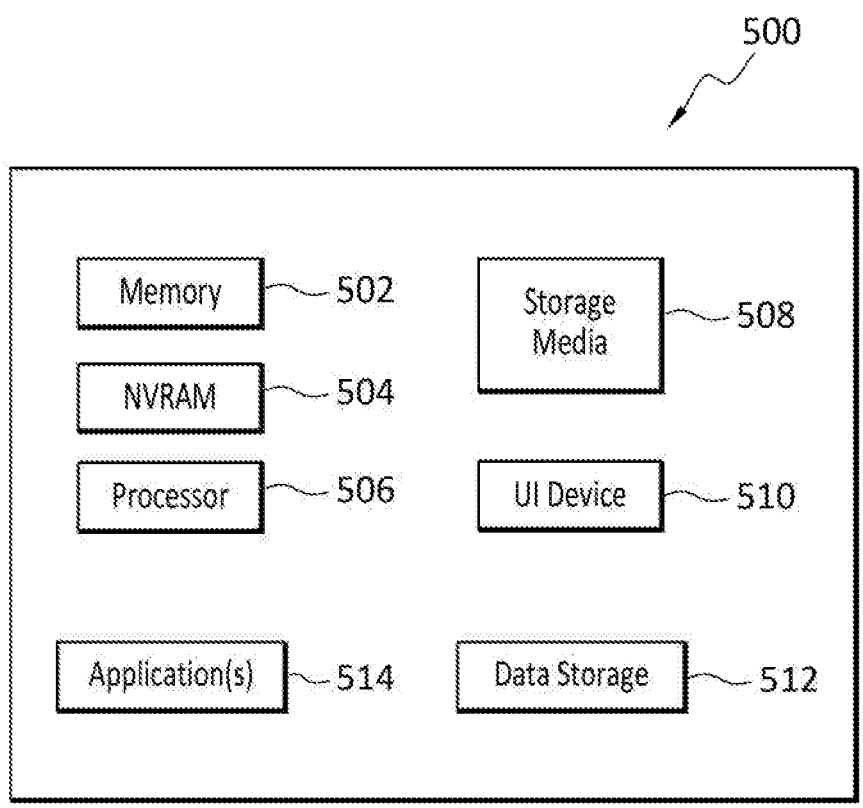
FIG. 4 discloses aspects of an example computing entity configured to perform any of the disclosed methods and processes.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 4.

In the example of FIG. 4, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
  receiving a user request for a data set, wherein the user request comprises information concerning user requirements for the data set;
  identifying data records that satisfy one or more of the user requirements, wherein each of the data records includes content of one or more types;
  identifying and selecting a method that generates a data set based on the user request;
  generating a data set that includes the data records by using the selected method;
  generating one or more additional data sets, such that a plurality of data sets including the data set and the one or more additional data sets are generated, wherein each of the plurality of data sets is generated by a selected method based on a respective user request and the information concerning the user requirements;
  calculating a respective relative value for each of the plurality of data records, wherein the relative values are based in part on the user requirements and each relative value is based on either relevance of an associated data record to the user requirements or user utilization of a data set which included the associated data record;
  providing access controls for each data record, wherein the access controls enable tracing of accesses of the data record and all locations where the data records have been;
  presenting the plurality of data sets to a user; and
  receiving feedback from a user, the feedback comprising a selection of ranking over the plurality of data sets.

2. The method as recited in claim 1, wherein the data set is generated based on user feedback concerning a prior data set that included one or more of the data records.

3. The method as recited in claim 1, further comprising tracing and recording, on a data record basis, an access history of each data record.

4. The method as recited in claim 1, further comprising providing a suggestion to the user concerning the requested data set,
  wherein the suggestion is based on one or more of user feedback concerning another data set, and usage information concerning the another data set.

5. The method as recited in claim 1, wherein tracing of accesses of the data record includes tracing both successful and unsuccessful attempts to access the data record, the data record that was accessed or attempted to be accessed, an owner of the data record, a number of attempts made, identity of a party that made the attempt, and a time when and a place where each attempt was made.

6. The method as recited in claim 1, wherein the user requirements include one or more of terms, types of learning, format, a processing location, price, a timeframe, a number of data pieces, intended use, or minimum quality rating.

7. The method as recited in claim 1, wherein a particular one of the respective methods is used based on an assigned specified priority for that particular one of the respective methods relative to an assigned priority of another of the respective methods.

8. The method as recited in claim 1, wherein one or more secondary recommendations as to other methods of data set generation are presented to the user.

9. A non-transitory storage medium having stored therein instructions that are executable by one or more hardware processors to perform operations comprising:
  receiving a user request for a data set, wherein the user request comprises information concerning user requirements for the data set;
  identifying data records that satisfy one or more of the user requirements, wherein each of the data records includes content of one or more types;

identifying and selecting a method that generates a data set based on the user request;

generating a data set that includes the data records by using the selected method;

generating one or more additional data sets, such that a plurality of data sets including the data set and the one or more additional data sets are generated, wherein each of the plurality of data sets is generated by a different selected method based on a respective user request and the information concerning the user requirements;

calculating a respective relative value for each of the plurality of data records, wherein the relative values are based in part on the user requirements and each relative value is based on either relevance of an associated data record to the user requirements or user utilization of a data set which included the associated data record;

providing access controls for each data record, wherein the access controls enable tracing of accesses of the data record and all locations where the data records have been;

presenting the plurality of data sets to a user; and receiving feedback from a user, the feedback comprising a selection of ranking over the plurality of data sets.

10. The non-transitory storage medium as recited in claim 9, wherein the data set is generated based on user feedback concerning a prior data set that included one or more of the data records.

11. The non-transitory storage medium as recited in claim 9, wherein the operations further comprise tracing and recording, on a data record basis, an access history of each data record.

12. The non-transitory storage medium as recited in claim 9, wherein the operations further comprise providing a suggestion to the user concerning the requested data set, and the suggestion is based on one or more of user feedback concerning another data set, and usage information concerning the another data set.

13. The non-transitory storage medium as recited in claim 9, wherein tracing of accesses of the data record includes tracing both successful and unsuccessful attempts to access the data record, the data record that was accessed or attempted to be accessed, an owner of the data record, a number of attempts made, identity of a party that made the attempt, and a time when and a place where each attempt was made.

14. The non-transitory storage medium as recited in claim 9, wherein the user requirements include one or more of terms, types of learning, format, a processing location, price, a timeframe, a number of data pieces, intended use, or minimum quality rating.

15. The non-transitory storage medium as recited in claim 9, wherein a particular one of the respective methods is used based on an assigned specified priority for that particular one of the respective methods relative to an assigned priority of another of the respective methods.

16. The non-transitory storage medium as recited in claim 9, wherein one or more secondary recommendations as to other methods of data set generation are presented to the user.

* * * * *